United States Patent
Maeda et al.

(10) Patent No.: US 8,364,324 B2
(45) Date of Patent: Jan. 29, 2013

(54) ENERGY MANAGEMENT SYSTEM

(75) Inventors: Yuko Maeda, Ibaraki-shi (JP); Naohisa Morimoto, Osaka-shi (JP); Akiko Takamiya, Osaka-shi (JP)

(73) Assignee: Panasonic Corporation, Osaka (JP)

( * ) Notice: Subject to any disclaimer, the term of this patent is extended or adjusted under 35 U.S.C. 154(b) by 433 days.

(21) Appl. No.: 12/743,687

(22) PCT Filed: Nov. 20, 2008

(86) PCT No.: PCT/JP2008/071153
§ 371 (c)(1),
(2), (4) Date: May 19, 2010

(87) PCT Pub. No.: WO2009/066741
PCT Pub. Date: May 28, 2009

(65) Prior Publication Data
US 2010/0274403 A1    Oct. 28, 2010

(30) Foreign Application Priority Data
Nov. 20, 2007    (JP) .................. 2007-301048

(51) Int. Cl.
*G05D 3/12*    (2006.01)
*G05D 5/00*    (2006.01)
*G05D 9/00*    (2006.01)
*G05D 11/00*   (2006.01)
*G05D 17/00*   (2006.01)

(52) U.S. Cl. ........................ 700/291; 700/295
(58) Field of Classification Search .......... 700/291, 700/295
See application file for complete search history.

(56) References Cited

U.S. PATENT DOCUMENTS

| | | | |
|---|---|---|---|
| 7,216,021 B2* | 5/2007 | Matsubara et al. | 700/295 |
| 7,310,571 B2* | 12/2007 | Kumazawa et al. | 700/245 |
| 7,797,084 B2* | 9/2010 | Miwa | 700/296 |
| 2004/0153170 A1* | 8/2004 | Santacatterina et al. | 700/1 |
| 2005/0096797 A1* | 5/2005 | Matsubara et al. | 700/291 |

(Continued)

FOREIGN PATENT DOCUMENTS

| | | |
|---|---|---|
| JP | 2001-103622 A | 4/2001 |
| JP | 2002-189779 A | 7/2002 |

(Continued)

OTHER PUBLICATIONS

International Search Report for the Application No. PCT/JP2008/071153 mailed Feb. 17, 2009.

*Primary Examiner* — Ronald Hartman, Jr.
(74) *Attorney, Agent, or Firm* — Cheng Law Group, PLLC

(57) ABSTRACT

Provided is an energy management system which can increase the awareness of energy saving. The energy management system according to the present invention includes a home appliance A located in a home, an external portable terminal PT, and a center device SV connected to the home appliance A and portable terminal PT via internet NT. The home appliance A includes an energy management unit 3 and a display control device CV. The center device SV stores for each home the electricity usage at a main breaker Bs and at branch breakers Bmn that is transmitted from the energy management unit 3 of each home. In the center device SV, the ranking in terms of the electricity usage or a degree of a decrease of the electricity usage is made relative to other homes on the basis of the stored electricity usage. The ranking is made for each home and transmitted to the display control device CV of the corresponding home.

11 Claims, 13 Drawing Sheets

U.S. PATENT DOCUMENTS

| | | | |
|---|---|---|---|
| 2007/0225861 A1* | 9/2007 | Kumazawa et al. | 700/245 |
| 2010/0283606 A1* | 11/2010 | Tsypin et al. | 340/540 |
| 2010/0286937 A1* | 11/2010 | Hedley et al. | 702/60 |
| 2010/0324962 A1* | 12/2010 | Nesler et al. | 705/8 |
| 2011/0029341 A1* | 2/2011 | Muse et al. | 705/7 |
| 2011/0251726 A1* | 10/2011 | McNulty et al. | 700/278 |

FOREIGN PATENT DOCUMENTS

| | | |
|---|---|---|
| JP | 2003-235159 A | 8/2003 |
| JP | 2005-73415 A | 3/2005 |
| JP | 2006-162424 A | 6/2006 |
| JP | 2006-345662 A | 12/2006 |

* cited by examiner

HOUSEHOLD DESIGNATION

| | | |
|---|---|---|
| NUMBER OF PEOPLE IN HOUSEHOLD | 5 | B36 |
| RESIDENCE REGION | OSAKA PREFECTURE | B37 |
| ALL-ELECTRIC | YES | B38 |

REGISTRATION — B39

B40 — RETURN

CV

16a

LOGOUT

ENERGY MANAGEMENT SYSTEM

TECHNICAL FIELD

The present invention relates to an energy management system.

BACKGROUND ART

A variety of energy management systems have heretofore been suggested. For example, Laid-Open Japanese Patent Application No. 2006-162424 discloses a configuration in which information relating to electricity usage is created based on measurement results of the entire electricity usage in each household (home) or electricity usage at each electric apparatus, and the created information is provided to each household.

In particular, in the energy management system disclosed in the aforementioned Laid-Open Japanese Patent Application, when information relating to the electricity usage is created, the results obtained by measurements in each household are compared with past electricity usage in the households and an average value for an housing complex (for example, mansions and the like) to which the household belongs.

Therefore, in the energy management system disclosed in the aforementioned Laid-Open Japanese Patent Application, it is possible to determine whether the electricity usage at the own household has increased over that in the past and whether the electricity usage is greater than the average value for the housing complex.

However, it is impossible to determine the ranking of the own household in terms of the electricity usage in comparison with other households in the housing complex and the degree to which the electricity usage can be decreased in comparison with that in other households.

Therefore, with the energy management system disclosed in the above-mentioned Laid-Open Japanese Patent Application, it is impossible to stimulate competition in terms of energy saving among the households, and this energy management system is insufficient from the standpoint of increasing the consciousness for energy saving.

DISCLOSURE OF INVENTION

In view of the above insufficiency, the purpose of the present invention has been accomplished to provide an energy management system capable of increasing the consciousness for energy saving.

The energy management system in accordance with the present invention includes a home appliance located in a home and a terminal device connected to the home appliance. The home appliance includes a main current measurement unit, a main electrical energy calculation unit, a branch current measurement unit, a branch electrical energy calculation unit, and a processing unit. The main current measurement unit is configured to measure a current flowing through a main breaker. The main electrical energy calculation unit is configured to calculate electricity usage at the main breaker on the basis of a measurement of the main current measurement unit. The branch current measurement unit is configured to measure a current flowing through each branch breaker connected to an output terminal of the main breaker. The branch electrical energy calculation unit is configured to calculate electricity usage at each of the branch breakers on the basis of a measurement of the branch current measurement unit. The processing unit is configured to generate information of the electricity usage at the home on the basis of the electricity usage calculated by the main electrical energy calculation unit together with the electricity usage calculated by the branch electrical energy calculation unit. The terminal device includes a display unit configured to display the information of the electricity usage generated by the processing unit. Further, the energy management system includes a server connected to the home appliance via an outside network. The server includes a history registration unit, an analysis unit, and a result transmission unit. The history registration unit is configured to store history information of the electricity usage at the main breaker and the electricity usage at the branch breaker of each of the homes. The analysis unit is configured to make a ranking of the homes in terms of the electricity usage according to the history information of each of the homes stored in the history registration unit. The result transmission unit is configured to transmit the ranking made by the analysis unit to the terminal device of each of the homes.

In accordance with the present invention, the ranking of the electricity usage is made on the basis of history information of each of the homes. Therefore, it is possible to determine whether the electricity usage of the own home is higher or lower than in the other homes. Thus, it is possible to stimulate competition in terms of energy saving among the homes. Accordingly, it is possible to induce a psychological drive aimed at raising the own ranking when it is low and maintaining or further raising the own ranking when it is high and further increase the consciousness for energy saving. As a result, the inhabitants of each home become mindful of energy saving and energy saving can be advanced.

In the preferred embodiment, the server includes a storage unit configured to store a data of a region designation webpage prepared to designate a region where a candidate of the home being ranked is located. The terminal device includes a browser unit and a designation unit, the browser unit being configured to obtain the data of the region designation webpage from the storage unit and control the display unit to display the same, and the designation unit being configured to designate the region within the region designation webpage displayed on the display unit. The analysis unit is configured to select the home located in the region designated by the designation unit as the candidate for the ranking.

According to this embodiment, a region where the home selected as the candidate for the ranking is located can be designated in the region designation webpage provided by the server. Therefore, the ranking of the electricity usage can be made in various regions.

In the preferred embodiment, the server includes a storage unit configured to store a data of a time period designation webpage prepared to designate a time period of the history information used for the ranking. The terminal device includes a browser unit and a designation unit, the browser unit being configured to obtain the data of the time period designation webpage from the storage unit and control the display unit to display the same, and the designation unit being configured to designate the time period in accordance with the time period designation webpage displayed on the display unit. The analysis unit is configured to make the ranking according to the history information included in the time period designated by the designation unit.

According to this embodiment, the time period of the history information used for the ranking can be designated in the time period designation webpage provided by the server. Therefore, the ranking of the electricity usage can be made in various time periods.

An energy management system according to another aspect of the present invention includes a home appliance located in a home, and a terminal device connected to the home appliance. The home appliance includes a main current measurement unit, a main electrical energy calculation unit, a branch current measurement unit, a branch electrical energy calculation unit, and a processing unit. The main current measurement unit is configured to measure a current flowing through a main breaker. The main electrical energy calculation unit is configured to calculate electricity usage at the main breaker on the basis of a measurement of the main current measurement unit. The branch current measurement unit is configured to measure a current flowing through each branch breaker connected to an output terminal of the main breaker. The branch electrical energy calculation unit is configured to calculate electricity usage at each of the branch breakers on the basis of a measurement of the branch current measurement unit. The processing unit is configured to generate information of the electricity usage at the home on the basis of the electricity usage calculated by the main electrical energy calculation unit together with the electricity usage calculated by the branch electrical energy calculation unit. The terminal device includes a display unit configured to display the information of the electricity usage generated by the processing unit. The energy management system according to another aspect of the present invention also includes a server connected to the home appliance via an outside network. The server includes a history registration unit, an analysis unit, and a result transmission unit. The history registration unit is configured to store history information of the electricity usage at the main breaker and the electricity usage at the branch breaker of each of the homes. The analysis unit is configured to make a ranking of the homes in terms of a degree of a decrease of the electricity usage in a predetermined time period according to the history information of each of the homes stored in the history registration unit. The result transmission unit is configured to transmit the ranking made by the analysis unit to the terminal device of each of the homes.

In accordance with the present invention, the ranking is made in terms of a degree of a decrease of the electricity usage in a predetermined time period according to the history information of each of the homes. Therefore, it is possible to determine whether a degree of a decrease of the electricity usage in the own home is higher or lower than in the other homes. Thus, it is possible to stimulate competition in terms of energy saving among the homes. Accordingly, it is possible to induce a psychological drive aimed at raising the own ranking when it is low and maintaining or further raising the own ranking when it is high and further increase the consciousness for energy saving. As a result, the inhabitants of each home become mindful of energy saving and energy saving can be advanced.

In the preferred embodiment, the server includes a storage unit configured to store a data of a region designation webpage prepared to designate a region where a candidate of the home being ranked is placed. The terminal device includes a browser unit and a designation unit, the browser unit being configured to obtain the data of the region designation webpage from the storage unit and control the display unit to display the same, and the designation unit being configured to designate the region in accordance with the region designation webpage displayed on the display unit. The analysis unit is configured to select the home placed in the region designated by the designation unit as the candidate for the ranking.

According to this embodiment, a region where the home selected as the candidate for the ranking is located can be designated in the region designation webpage provided by the server. Therefore, the ranking of the electricity usage can be made in various regions.

In the preferred embodiment, the server includes a storage unit configured to store a data of a time period designation webpage prepared to designate the predetermined time period. The terminal device includes a browser unit and a designation unit, the browser unit being configured to obtain the data of the time period designation webpage from the storage unit and control the display unit to display the same, and the designation unit being configured to designate the predetermined time period in accordance with the time period designation webpage displayed on the display unit. The analysis unit is configured to make the ranking according to the history information included in the predetermined time period designated by the designation unit.

According to this embodiment, the time period of the history information used for the ranking can be designated in the time period designation webpage provided by the server. Therefore, the ranking of a degree of a decrease of the electricity usage can be made in various time periods.

In the preferred embodiment, the server includes a storage unit configured to store a data of a class designation webpage prepared to designate a class indicative of whether or not a candidate of the home being ranked is an electric home. The terminal device includes a browser unit and a designation unit, the browser unit being configured to obtain the data of the class designation webpage from the storage unit and control the display unit to display the same, and the designation unit being configured to designate the class in accordance with the region designation webpage displayed on the display unit. The analysis unit is configured to select as the candidate for the ranking the home of the same class designated by the designation unit.

According to this embodiment, whether or not a candidate of the home being ranked is an electric home can be designated in the class designation webpage provided by the server. Therefore, the ranking can be made among the homes under the same conditions when the ranking is made. As a result, a more effective ranking can be made.

In the preferred embodiment, the result transmission unit is configured to transmit the ranking to the terminal device at a prescribed timing.

According to this embodiment, a user can obtain the ranking even when the user has no access to the server.

In the preferred embodiment, the result transmission unit is configured to transmit the ranking to the terminal device in response to a request from the terminal device.

According to this embodiment, the user can obtain the ranking at any desired time.

BRIEF DESCRIPTION OF DRAWINGS

FIG. 11 shows an example of a display screen of the terminal device of the aforementioned energy management system.

BEST MODE FOR CARRYING OUT THE INVENTION

Figure 1:
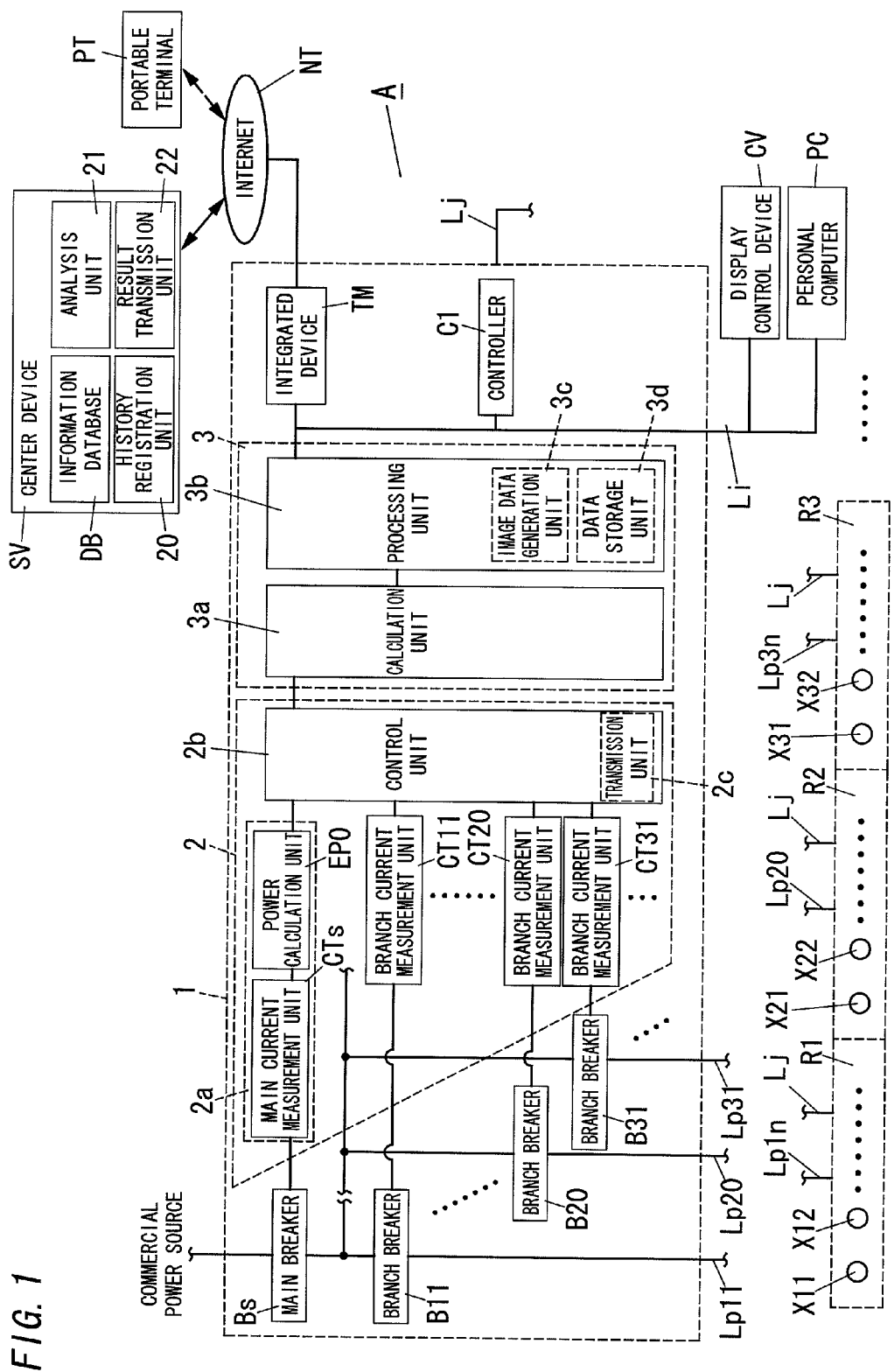
FIG. 1 is a block diagram illustrating the features of the energy management system of one embodiment of the present invention.

As shown in FIG. 1, the energy management system according to one embodiment of the present invention includes a home appliance A located in a home (a dwelling unit in the case of a housing complex), a terminal device TU (see FIG. 5) such as a personal computer PC, a display control device CV, and a portable terminal PT, and a center device (server) SV disposed outside the home. In this configuration, the center device SV is connected to the home appliance A via an internet NT, which is an external network (outside network).

The home appliance A includes an integrated control panel 1 disposed in the home and a plurality of electric apparatuses Xmn (symbols m and n are integers equal to or larger than 1; same hereinbelow) disposed in the home.

The electric apparatuses Xmn are connected to the integrated control panel 1 by a power line Lp for supplying commercial power and an information transmission line Lj. The electric apparatus Xmn can be illumination units, air conditioners, floor heating devices, and IH devices that are powered, controlled, and monitored by the integrated control panel 1.

Figure 3:
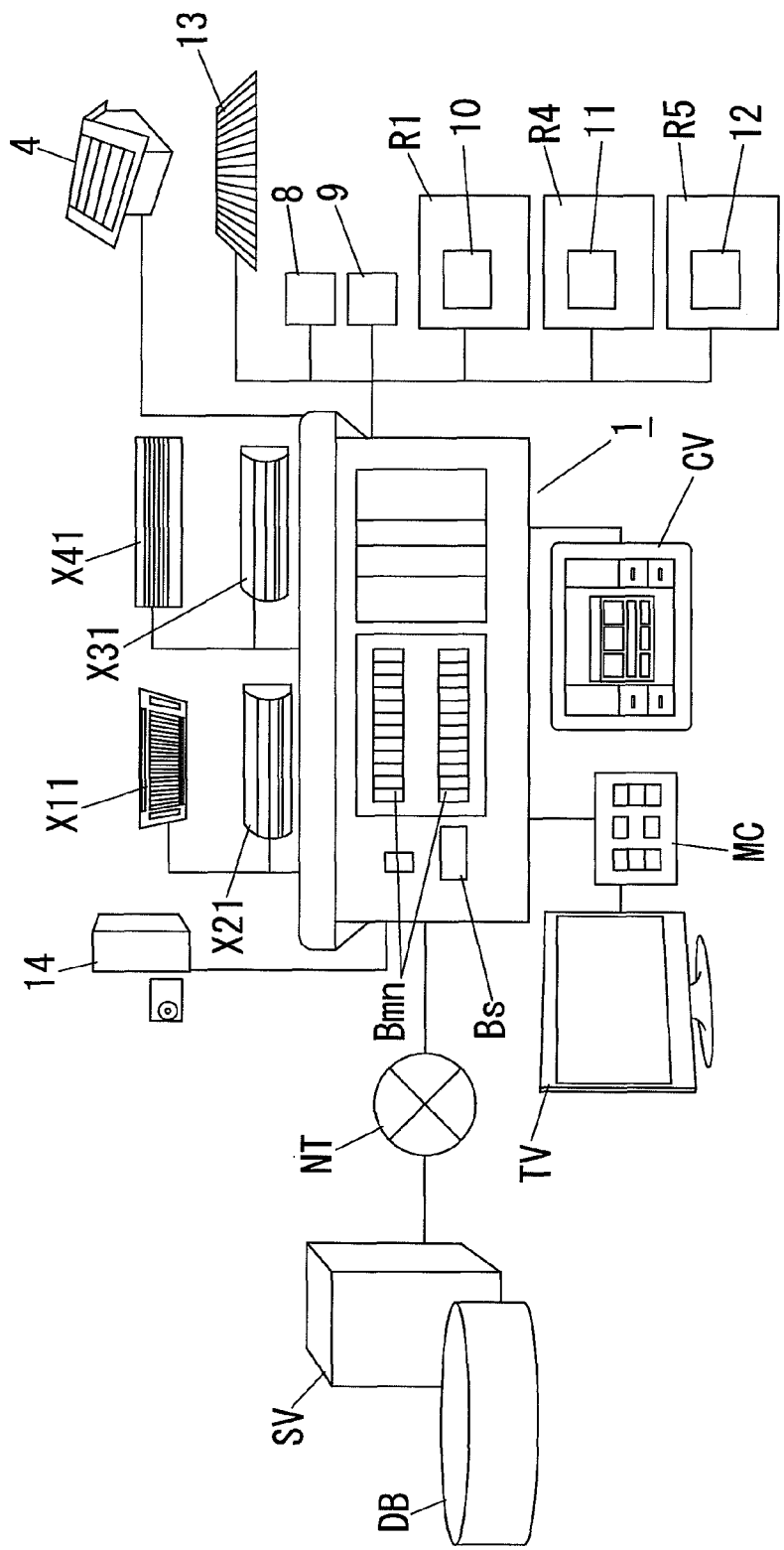
FIG. 3 is a system diagram illustrating the configuration of the aforementioned energy management system.

The personal computer PC and display control device CV are terminal devices having a web browser function and are disposed in the home. Such a terminal device (called hereinbelow, as necessary "a home terminal device") disposed in the home may also be a net television TV having a web browser function, as shown in FIG. 3. The net television TV is connected to the integrated control panel 1 via a multimedia outlet MC.

The portable terminal PT is a terminal device having a web browser function that is connected to the center device SV by the Internet NT and mainly taken out for use by the user (that is, used outside the home). The terminal device (called hereinbelow, as necessary "an outside terminal device") that is used outside the home may be a portable terminal device having a web browser function such as a notebook computer, a cellular phone, and a PDA (Personal Digital Assistance) that can be connected to the internet NT.

In the present embodiment, a home network using a typical communication protocol (TCP/IP, HTTP, or the like) is constituted by the integrated control panel 1 and the home terminal device. The home network is a local area network (LAN) conforming to a 100BASE-TX (IEEE 802.3u) standard. In the home network, the home terminal device corresponding to a network terminal is connected by a star wiring to the below-described integrated device TM corresponding to a layer 2 switch or a layer 3 switch inside the integrated control panel 1.

Figure 2:
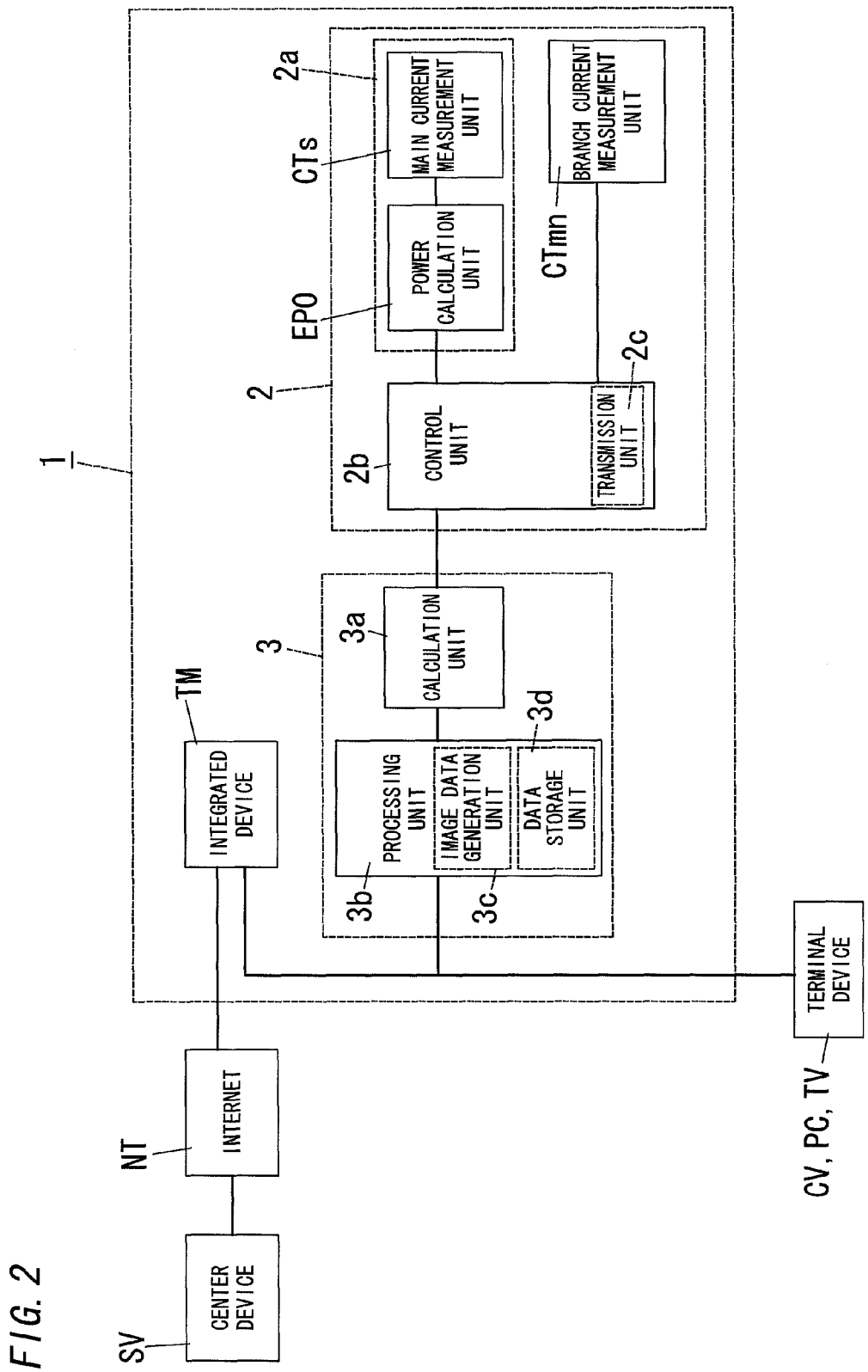
FIG. 2 is another block diagram illustrating the features of the aforementioned energy management system.

As shown in FIG. 1 and FIG. 2, the integrated control panel 1 includes a main breaker Bs, a plurality (only three are shown in FIG. 1) of branch breakers Bmn (m=1, 2, . . . , n=1, 2, . . . ), a current measurement unit 2, an energy management unit 3, the aforementioned integrated device TM, and an electric apparatus controller C1.

A power supply line for commercial power supply that is drawn into the home from the outside (external power generation equipment or the like) is connected to the input terminal of the main breaker Bs. The main electric circuit (main line) is connected to the output terminal of the main breaker Bs. A plurality of electric lines Lpmn (m=1, 2, . . . , n=1, 2, . . . ) that are branch electric lines (branch lines) for supplying power to the electric apparatuses Xmn are branched off the main electric line. The eclectic lines Lpmn are led out to the outside from the integrate control panel 1, and the electric apparatuses Xmn are connected to the electric lines Lpmn. Therefore, power is supplied to the electric apparatuses Xmn through the electric lines Lpmn. The branch breakers Bmn are inserted between the electric lines Lpmn and the electric apparatuses Xmn.

For example, a plurality of rooms Rm (m=1, 2, . . . ) such as a living room, a bedroom, and a children's room are provided in the home. Each room Rm is provided with the respective electric apparatus Xmn (m=1, 2, . . . , n=1, 2, . . . ) or with an outlet for connection of electric apparatuses Xmn.

In the present embodiment, as shown in FIG. 1 and FIG. 3, an air conditioner X11 or an outlet 10 (an outlet for connection of electric apparatuses Xmn that are used inside the room R1, the electric apparatuses being other than the air conditioner X11) provided in the room R1 (for example, a living room) are connected to the branch breakers B1n (n=1, 2, . . . ). Power is supplied to the air conditioner X11 or outlet 10 via the corresponding electric line Lp1n (n=1, 2, . . . ). An air conditioner X21 provided in the room R2 (for example, a children's room) is connected to the branch breaker B20. Power is supplied to the air conditioner X21 via the electric line Lp20. Further, an air conditioner X31 provided in the room R3 (for example, a bedroom) is connected to the branch breaker B31. Power is supplied to the air conditioner X31 via the electric line Lp31. Further, an air conditioner X41 or an outlet 8 for a refrigerator provided in the room R4 (for example, a kitchen) is connected to the branch breaker B4n (n=1, 2, . . . ). Power is supplied to the air conditioner X41 or outlet 8 via the corresponding electric line Lp4n (n=1, 2, . . . ). Further, an outlet 11 (an outlet for connection of the electric apparatus used in the room R5) provided in the room R5 (for example, a Japanese room) is connected to the branch breaker B51. Power is supplied to the outlet 11 via the electric line Lp51. Further, a water heater 14, a floor heater 13, and an outlet 9 for a washing machine are connected to branch breakers Bmn (m=6, 7, . . . , n=1, 2, . . . ). Power is supplied to the water heater 14, floor heater 13, and outlet 9 via the corresponding electric lines Lpmn (m=6, 7, . . . , n=1, 2, . . . ).

The current measurement unit 2 is configured to measure a current flowing in the main breaker Bs and the branch breakers Bmn. More specifically, the current measurement unit 2 is provided with a main power measurement unit 2a, branch current measurement units CTmn (m=1, 2, ..., n=1, 2, ...), and a control unit 2b.

The main power measurement unit 2a is configured to measure periodically main electrical energy supplied via the main breaker Bs (electricity usage at the main breaker Bs). For example, the main power measurement unit 2a is provided with a main current measurement unit CTs that measures periodically the main current flowing in the main breaker Bs and a power calculation unit EPO that calculates electrical energy on the basis of measured main current. Thus, in the main power measurement unit 2a, the measured value of the main current measured by the main current measurement unit CTs is converted by the power calculation unit EPO into electrical energy, thereby calculating the main electrical energy supplied via the main breaker Bs.

The branch current measurement units CTmn measure periodically a value of a branch current flowing in each branch breaker Bmn for each branch breaker. For example, the branch current measurement unit CTmn is provided with a current sensor (not shown in the figure) that detects the branch current flowing in the electric line Lpmn and a sensor unit (not shown in the figure) that generates a detection data on the basis of the detection output of the current sensor. The sensor unit is configured to modulate the generated detection data into signals for transmission and output the modulated data to the control unit 2b. Such branch current measurement units CTmn are provided for the branch breakers Bmn, respectively.

The control unit 2b collects the measurement data of the main power of the main breaker Bs and of the branch current of each branch breaker Bmn. Further, the control unit 2b outputs the collected measurement data as detection information to the energy management unit 3. More specifically, the control unit 2b demodulates the transmission signal inputted from the sensor unit, extracts the detection data, and successively sends the acquired detection data from the transmission unit 2c to the energy management unit 3.

The energy management unit 3 is configured to calculate the electricity usage on the basis of measurement data inputted from the current measurement unit 2. For example, the energy management unit 3 is provided with a calculation unit (electricity usage calculation unit) 3a and a processing unit 3b.

The calculation unit 3a is configured to calculate branch electrical energy (electricity usage at the branch breakers Bmn) supplied via the branch breakers Bmn on the basis of the measurement data of the branch current for each branch breaker Bmn received from the transmission unit 2c.

The processing unit 3b includes an image data generation unit 3c and a data storage unit 3d and is connected via a LAN cable to the integrated device TM and electric apparatus controller C1 located inside the integrated control panel 1.

The data storage unit 3d is a storage device for storing information of various kinds. The data storage unit 3d stores, for example, designation information of various kinds relating to power monitoring. The designation information is such as data of the branch breakers Bmn as a target of electrical energy detection, and a designation of electric check. In this case, data of the branch breakers Bmn are, for example, a name designation of the branch breakers Bmn (for example, branch 1, branch 2, etc.) or information of names of electric apparatuses Xmn connected to the branch breakers Bmn and the usage sites thereof. For example, data of the branch breakers Bmn provided separately for individual circuits such as an air conditioner or floor heating equipment include the names of corresponding electric apparatuses Xmn. Further, data of the branch breakers Bmn that can be connected to unspecified electric apparatuses Xmn, rather than to individual circuits, include the names of electric apparatuses Xmn (for example, an illumination device, a television, a water heating device, etc.) that can be connected to the branch breakers Bmn or main usage sites. In this case, the names of electric apparatuses (for example, hot carpet or iron) Xmn that are highly probable to be connected to the branch breakers Bmn and used by the user and the usage sites of such apparatuses are preferably designated.

The data storage unit 3d stores information (for example, application, installation site, or branch current during shut down) of the electric apparatuses Xmn connected to the branch breakers Bmn. Further, the main electrical energy inputted from the calculation unit 3a and branch electrical energy for each branch breaker Bmn are successively stored in a time sequence in the data storage unit 3d. Thus, history information indicating history of the electricity usage in the main breaker Bs and electricity usage in the branch breakers Bmn is registered in the data storage unit 3d.

The image data generation unit 3c is configured to generate information of the electricity usage in the home on the basis of the designation information stored in the data storage unit 3d and the main electrical energy and branch electrical energy calculated by the calculation unit 3a. In this case, the information of the electricity usage in the home is for example, a screen data such as web contents (webpage) displayed on a terminal device TU such as the display control device CV. In a specific example, the information of the electricity usage in the home is an image data representing the branch electrical energy, an image data representing each branch electrical energy, or an image data indicating the results of electric check. In this case, the electric check determines whether the electric apparatuses Xmn connected to the branch breakers Bmn are in a state of usage. Such an electric check is conducted by the processing unit 3b that compares the branch electrical energy of each branch breaker Bmn inputted from the calculation unit 3a and a threshold designated for each branch breaker Bmn. Information relating to the designation as to whether to conduct the aforementioned electric check and to the designation of the threshold is included in the designation information.

The aforementioned processing unit 3b includes a web server function. The web server function is a function of generating the screen data in the image data generation unit 3c in response to various request signals inputted from the terminal device TU via the integrated device TM, and transmit (send) the generated screen data to the terminal device TU that has sent the request signals. Further, the processing unit 3b also has a function (designation information update function) of rewriting the designation information stored in the data storage unit 3d into the obtained designation information when the designation information is received from the terminal device TU.

The center device SV is constituted by a typical computer device having a network function. The center device SV has a function (relay function) of relaying signals (messages) addressed to the home appliance A that have been transmitted by the external terminal device such as the portable terminal PT or signals addressed to the external terminal device that have been transmitted by the home appliance A.

Further, the center device SV is provided with information database (storage unit) DB. Bits of knowledge (for example, monthly bits of knowledge) about energy saving are successively saved in the information database DB. The center device SV sends the bits of knowledge about energy saving that have been saved in the information database DB to the terminal device TU (display control device CV, personal computer PC, or portable terminal PT).

The center device SV includes a history registration unit 20, an analysis unit (comparison unit) 21, and a result transmission unit 22.

The history registration unit 20 is configured to acquire the history information from the processing unit 3b or receive the history information from the processing unit 3b and to register the history information in the information database DB for each home.

The analysis unit 21 has a function of ranking the electricity usage on the basis of the history information for each home that is registered by the history registration unit 20 in the information database DB. In this case, the ranking of the electricity usage is conducted by comparing the electricity usage of the main breakers Bs of the homes registered in the information database DB or comparing the electricity usage of branch breakers Bmn of the homes for each branch breaker Bmn.

In order to make such a ranking of electricity usage, it is necessary to determine a condition such as a range in which the ranking is to be made. In this case, a data of a webpage that is used to designate the conditions of ranking the electricity usage is stored in the information database DB. The data of a webpage includes a data of a first region designation webpage, a data of a first time period designation webpage, and a data of a first class designation webpage. This plurality of designation webpages may be also combined into one webpage.

The first region designation webpage is used to designate a region (residence region) where a candidate (that is, a candidate for comparison) of the home to be ranked in terms of the electricity usage is located. The residence region is for example the entire country, a prefecture, a city, a district, or lots for sale. The first time period designation webpage is used to designate a time period of the history information to be used for ranking in terms of electricity usage. The time period is for example, a week, a month, half a year, or a year. The first class designation webpage is used to designate a class of a candidate of the home to be ranked in terms of electricity usage. The class as referred to herein is an electric home (an all-electric home) or an electric-gas home. The aforementioned residence region, time period, and class are merely exemplary characteristics and are not intended to be limiting.

The analysis unit 21 has a function of ranking a degree of a decrease (for example, decrease ratio) of the electricity usage in the predetermined time period on the basis of the history information for each home registered by the history registration unit 20 in the information database DB. In this case, when the ranking of the decrease ratio of the electricity usage is made, the decrease ratio of the electricity usage is calculated, for example, from the electricity usage in the previous month and the electricity usage in the current month with respect to the main breaker Bs or each branch breaker Bmn of each home that is registered in the information database DB. The ranking of the decrease ratio of the electricity usage is made by comparing the calculated decrease ratios for each home.

In order to make the ranking of the decrease ratio of electricity usage, it is necessary to determine a condition such as a range in which the ranking is to be made. In this case, a data of a webpage that is used to designate the conditions of ranking the decrease ratio of the electricity usage is stored in the information database DB. The data of the webpage includes a data of a second region designation webpage, a data of a second time period designation webpage, and a data of a second class designation webpage. This plurality of designation webpages may be also combined into one webpage.

The second region designation webpage is used to designate a region (residence region) where a candidate (that is, a candidate for comparison) of the home to be ranked in terms of the decrease ratio of the electricity usage is located. The residence region is for example the entire country, a prefecture, a city, a district, or lots for sale. The second time period designation webpage is used to designate the predetermined time period. The predetermined time period is for example, a week, a month, half a year, or a year. The second class designation webpage is used to designate a class of a candidate of the home to be ranked in terms of electricity usage. The class as referred to herein is the all-electric home or the electric-gas home. The aforementioned residence region, time period, and class are merely exemplary characteristics and are not intended to be limiting.

Figure 5:
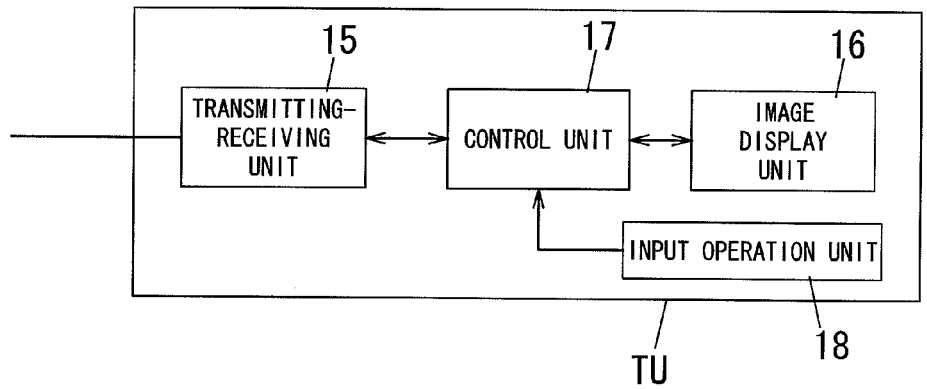
FIG. 5 is a block diagram of the terminal device of the aforementioned energy management system.

As shown in FIG. 5, the terminal device TU is provided with a transmitting-receiving unit 15, an image display unit (display unit) 16 composed of a liquid crystal display, an input operation unit 18, and a control unit 17 that conducts complete control of the transmitting-receiving unit 15, image display unit 16, and input operation unit 18. The transmitting-receiving unit 15 serves to exchange data with the integrated device TM. The input operation unit 18 serves to input operation signals. For example, when the terminal device TU is the display control device CV, the input operation unit 18 is a touchpad disposed on the front surface of the image display unit 16 and together with the image display unit 16 constitutes a touch panel. When the terminal unit TU is the personal computer PC or portable terminal PT, the input operation unit 18 is constituted by a keyboard or ten keys.

In the terminal device TU, the control unit 17 functions as a web browser that acquires a data of a webpage from the information database DB of the center device SV and displays the acquired webpage on the image display unit 16. Thus, the control unit 17 constitutes a browser unit. In the browser unit of the present embodiment, data of the first region designation webpage, data of the first time period designation webpage, data of the first class designation webpage, data of the second region designation webpage, data of the second time period designation webpage, and data of the second class designation webpage are acquired from the information database DB.

The terminal device TU also has a designation unit for inputting predetermined information according to the contents of the webpage that is being displayed on the image display unit 16 by the browser unit. The designation unit is realized by the control unit 17 executing various types of control in response to the input contents of the input operation unit 18. In this case, where the webpage that is being displayed on the image display unit 16 is the first region designation webpage, the predetermined information is information of the region where the candidate of the home being ranked in terms of the electricity usage is located. Where the webpage that is being displayed is the second region designation webpage, the predetermined information is information of the region where the candidate of the home being ranked in terms of the decrease ratio of the electricity usage is located. Where the webpage that is being displayed on the image display unit 16 is the first time period designation webpage, the predetermined information is information of the time period of the history information that is used for ranking in terms of the electricity usage. Where the webpage that is being displayed is the second time period designation webpage, the predetermined information is information of the predetermined time period. Where the webpage that is being displayed on the image display unit 16 is the first class designation webpage, the predetermined information is information of the class of the candidate of the home being ranked in terms of the electricity usage. Where the webpage that is being displayed is the second class designation webpage, the predetermined information is information of the class of the candidate of the home being ranked in terms of the decrease ratio of electricity usage.

Where the designation by the designation unit is completed (input of the predetermined information is completed), the inputted predetermined information is transmitted to the analysis unit 21 of the center device SV.

The analysis unit 21 makes the ranking on the basis of the predetermined information designated by the designation unit. More specifically, when the analysis unit 21 makes the ranking in terms of the electricity usage, the analysis unit takes the home located in the region designated by the designation unit according to the first region designation webpage as the candidate for the ranking in terms of the electricity usage. Further, the analysis unit 21 makes the ranking in terms of the electricity usage on the basis of the history information within the time period designated by the designation unit according to the first time period designation webpage. The analysis unit 21 also takes the home of the same class as that designated by the designation unit according to the first class designation webpage as the candidate for the ranking in terms of the electricity usage. By contrast, when the analysis unit 21 makes the ranking in terms of the decrease ratio of the electricity usage, the analysis unit takes the home located in the region designated by the designation unit according to the second region designation webpage as the candidate for the ranking in terms of the decrease ratio of the electricity usage. Further, the analysis unit 21 makes the ranking in terms of the decrease ratio of the electricity usage on the basis of the history information within the time period designated by the designation unit according to the second time period designation webpage. The analysis unit 21 also takes the home of the same class as that designated by the designation unit according to the second class designation webpage as the candidate for the ranking in terms of the decrease ratio of the electricity usage.

The result transmission unit 22 is configured to transmit the ranking made by the analysis unit 21 (ranking in terms of the electricity usage or ranking in terms of the degree of the decrease of the electricity usage) to the terminal device TU of each home. The result transmission unit 22 has a push-type information providing function and a pull-type information providing function. The push-type information providing function is a function of transmitting the ranking (ranking in terms of the electricity usage or ranking in terms of the degree of the decrease of the electricity usage) at a predetermined timing such as with a predetermined period (for example, once a month) to the terminal device TU. With such a function, the ranking results can be obtained even when the user has no access to the center device SV. Meanwhile, the pull-type information providing function is a function of transmitting the ranking (ranking in terms of the electricity usage or ranking in terms of the degree of the decrease of the electricity usage) to the terminal device TU in response to a request from the terminal device TU. With these functions, the user can obtain the ranking results at any desired time.

The integrated device TM has an internet connection function corresponding to the type (telephone circuit, CATV circuit, optical fiber circuit, and the like) of the circuit for connecting to the Internet NT. The home network is connected via the integrated device TM to the internet NT, which is the external network. Further, the integrated device TM also controls the exchange of data in the network and has a packet processing function, a path switching function, a network security function and a function of control point of UPnP (Universal Plug and Play). In the present embodiment, the integrated device TM is connected to the processing unit 3b of the energy management unit 3 located in the integrated control panel 1 or the electric apparatus controller C1, personal computer PC outside the integrated control panel 1, and display control device CV via a LAN cable (LAN cable of enhanced category 5 or category 6). Further, the integrated device TM is connected to the center device SV or the portable terminal PT or another terminal device via the internet NT. Therefore, the center device SV is connected to the home network via the internet NT. As a result, by conducting data communication between the portable terminal PT and the center device SV via the internet NT, it is possible to control or monitor the electric apparatuses Xmn inside the home from an outside address by using the portable terminal PT.

The electric apparatus controller C1 has an interface function for the integrated device TM and an interface function for the electric apparatuses Xmn conforming to a unified standard of The Japan Electrical Manufacturers' Association (JEMA). Further, the electric apparatus controller C1 has a function (control function) of controlling individually the electric apparatuses Xmn via the information transmission line Lj and switching between active and inactive state of the apparatuses when the electric apparatus controller C1 receives a control request message from the terminal device TU via the integrated device TM. In addition, the electric apparatus controller C1 has a monitoring function. The monitoring function is a function of individually obtaining the operation state (operates "Light ON" or stopped "Light OFF") of each electric apparatus Xmn via the information transmission path Lj when a monitoring request message is received from the terminal device TU via the integrated device TM and transmitting a message (operation state of each electric apparatus Xmn) in response to the control request or monitoring request to the terminal device TU that is a transmission source of the monitoring request message. Further, the apparatus name information of the electric apparatuses Xmn that are under autonomous control and name information rooms Rm is stored preliminarily in the electric apparatus controller C1. In addition, the electric apparatus controller C1 has a web server function. The web server function is a function of creating web contents (web page) for representing the name and also the operation state of the electric apparatuses Xmn by text or symbols and providing (distributing) the web contents to the terminal device TU in response to a request from the terminal device TU.

Figure 4:
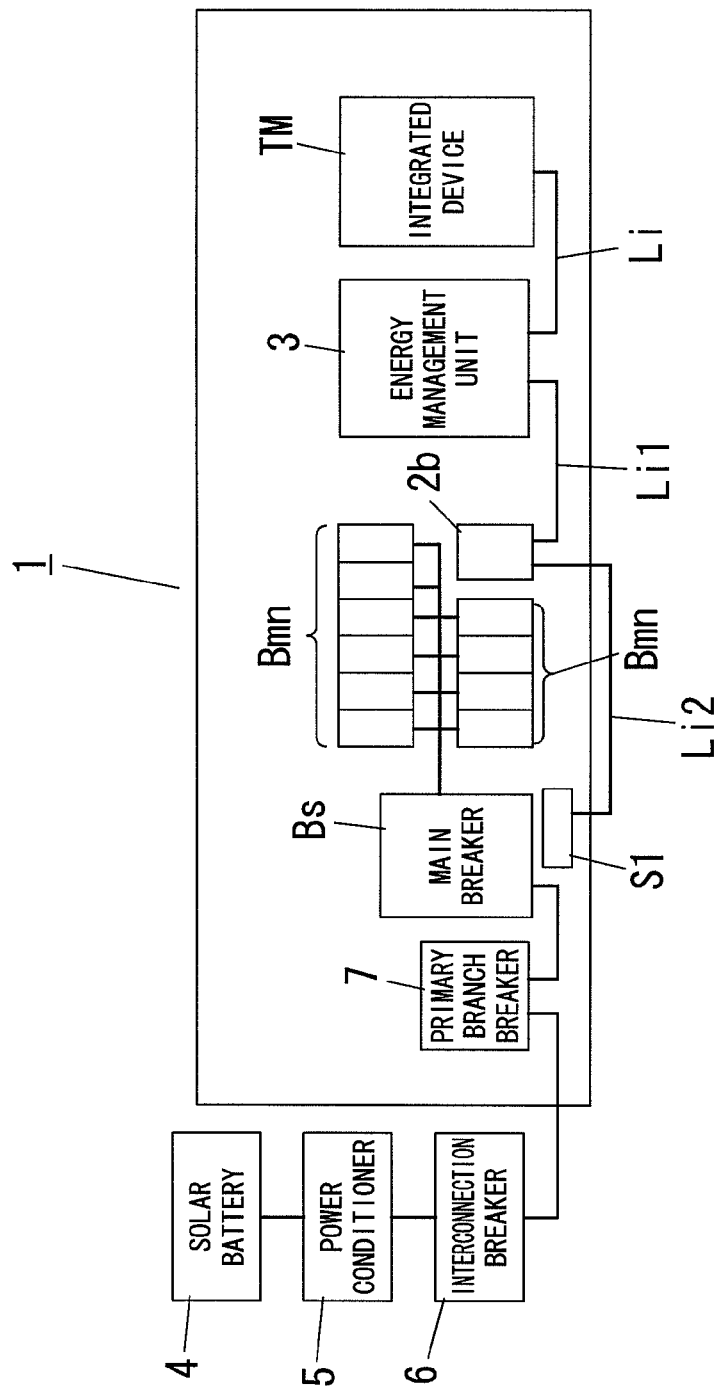
FIG. 4 shows an arrangement of components in an integrated control panel of the aforementioned energy management system.

FIG. 4 shows an arrangement of the main breaker Bs, branch breakers Bmn, control unit 2b constituting the current measurement unit 2, energy management unit 3, and integrated device TM in the integrated control panel 1. A plurality of the branch breakers Bmn is arranged in two, upper and lower, rows and disposed in the transverse direction to the right of the main breaker Bs. The control unit 2b is disposed to the right of the branch breakers Bmn. A main power measurement sensor S1 constituting the main power measurement unit 2a is disposed below the main breaker Bs. The main power measurement sensor S1 is connected by a communication cable Li2 (for example, RS485 or the like) to the control unit 2b. Therefore, the main electrical energy of the main breaker Bs measured by the main power measurement sensor S1 is inputted via the communication cable Li2 to the control unit 2b. Further, the energy management unit 3 is disposed to the right of the control unit 2b. The integrated device TM is disposed to the right of the energy management unit 3. The energy management unit 3 is connected to the integrated device TM by the LAN cable Li and connected to the control unit 2b by a communication cable Li1 (for example, RS485 or the like). Therefore, the main power of the main breaker Bs and the measurement data of branch current of each branch breaker Bmn transmitted from the transmission unit 2c of the control unit 2b are inputted via the communication cable Li1 to the energy management unit 3.

In the present embodiment, as shown in FIG. 4, power can be also supplied from a solar battery 4 using solar energy, rather than only from the commercial power supply. The solar battery 4 is a DC power source in the form of a panel in which a large number of solar cells (elements that photoelectrically convert solar energy into electrical energy). The DC power generated by the solar battery 4 is converted by a power conditioner 5 into AC power and supplied to a load via an interconnection breaker 6 and a primary branch breaker 7 in combination with the commercial power.

With the energy management system of the above-described embodiment, the ranking of the electricity usage is made on the basis of the history information relating to each home. Therefore, it is possible to determine whether the electricity usage in the own home is larger or smaller than in other homes. Thus, it is possible to stimulate competition in terms of energy saving among the homes. Accordingly, it is possible to induce a psychological drive aimed at raising the own ranking when it is low and maintaining or further raising the own ranking when it is high and further increase the consciousness for energy saving. As a result, the inhabitants of each home become mindful of energy saving and energy saving can be advanced.

Further, the region where the home selected as the candidate for the ranking of the electricity usage is located can be designated in the first region designation webpage provided by the center device SV. Therefore, the ranking of the electricity usage can be made in various regions. The time period of the history information used for the ranking of the electricity usage can be designated in the first time period designation webpage provided by the center device SV. Therefore, the ranking of the electricity usage can be made in various time periods. In addition whether the home selected as the candidate for the ranking of the electricity usage is the all-electric home can be designated in the first class designation webpage provided by the center device SV. Therefore, for example, where the own home is the all-electric home, the home class in the first class designation webpage can be set to the all-electric home, thereby making it possible to make ranking among the homes under the same conditions when the ranking of the electricity usage is made. As a result, more effective ranking can be made. Where the own home is the electric-gas home, the home class in the first class designation webpage can be set to the electric-gas home. Where it is not necessary to classify the homes into all-electric or electric-gas homes, all the homes may be candidates for the ranking.

Further, with the energy management system of the present embodiment, the ranking of the degree of the decrease of the electricity usage in the predetermined time period is made on the basis of the history information relating to each home. Therefore, it is possible to determine whether the degree of the decrease of the electricity usage in the own home is larger or smaller than in other homes. Thus, it is possible to stimulate competition in terms of energy saving among the homes. Accordingly, it is possible to induce a psychological drive aimed at raising the own ranking when it is low and maintaining or further raising the own ranking when it is high and further increase the consciousness for energy saving. As a result, the inhabitants of each home become mindful of energy saving and energy saving can be advanced.

Further, the region where the home selected as the candidate for the ranking of the degree of the decrease of the electricity usage is located can be designated in the second region designation webpage provided by the center device SV. Therefore, the ranking of the degree of the decrease of the electricity usage can be made in various regions. The time period of the history information used for the ranking of the degree of the decrease of the electricity usage can be designated in the second time period designation webpage provided by the center device SV. Therefore, the ranking of the degree of the decrease of the electricity usage can be made in various time periods. In addition whether the home selected as the candidate for the ranking of the degree of the decrease of the electricity usage is the all-electric home can be designated in the second class designation webpage provided by the center device SV. Therefore, the ranking among the homes can be made under the same conditions when the ranking of the degree of the decrease of the electricity usage is made. As a result, more effective ranking can be made.

An operation example of the energy management system of the present embodiment is explained below with reference to FIG. 6 to FIG. 9.

Initially, a procedure of designating information relating to the own household in the center device SV is explained.

Figure 6:
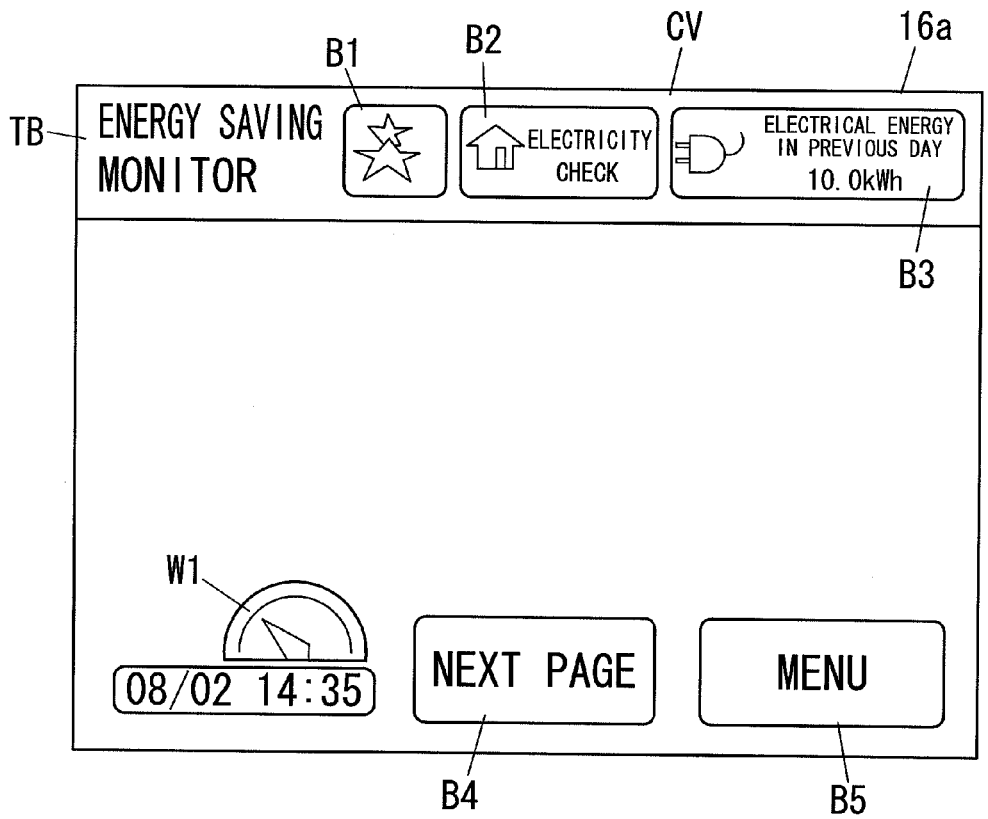
FIG. 6 shows an example of a display screen of the terminal device of the aforementioned energy management system.
Figure 7:
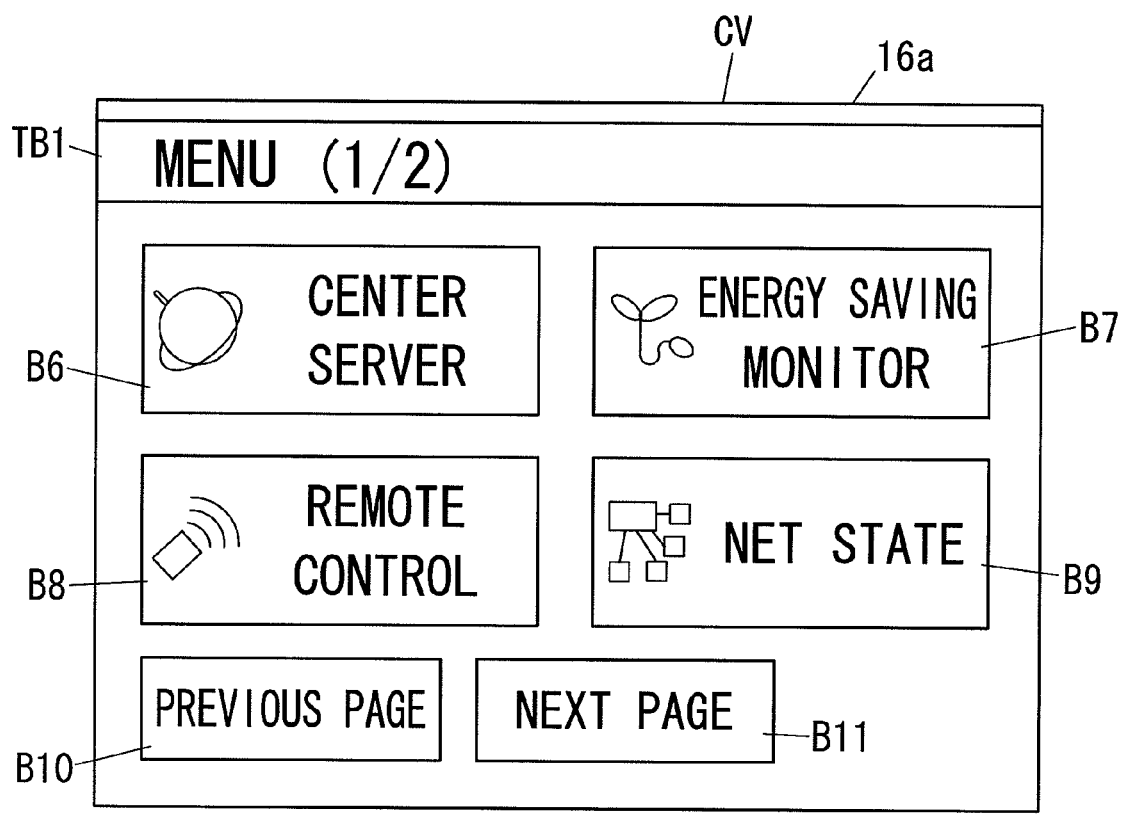
FIG. 7 shows an example of a display screen of the terminal device of the aforementioned energy management system.
Figure 8:
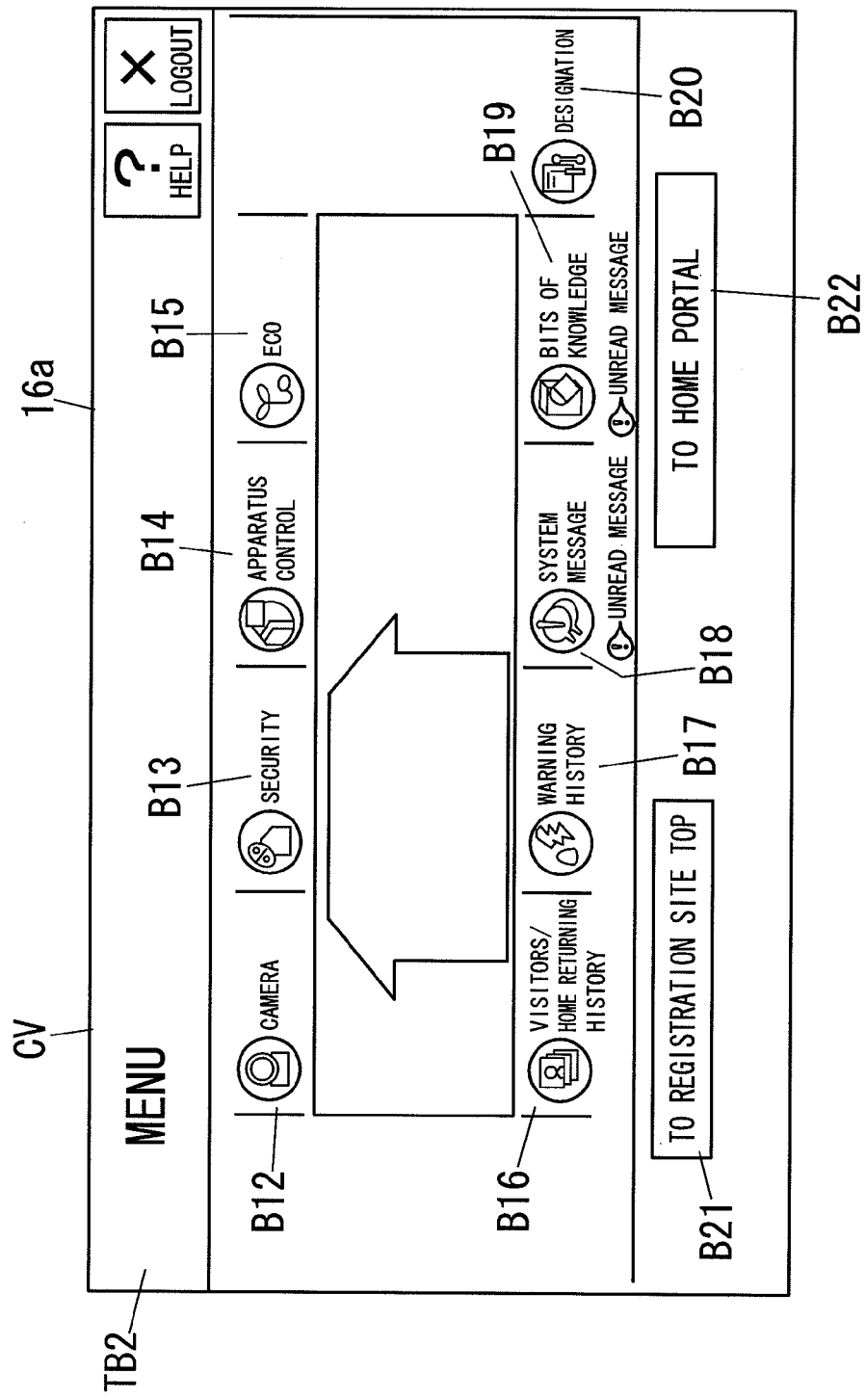
FIG. 8 shows an example of a display screen of the terminal device of the aforementioned energy management system.
Figure 9:
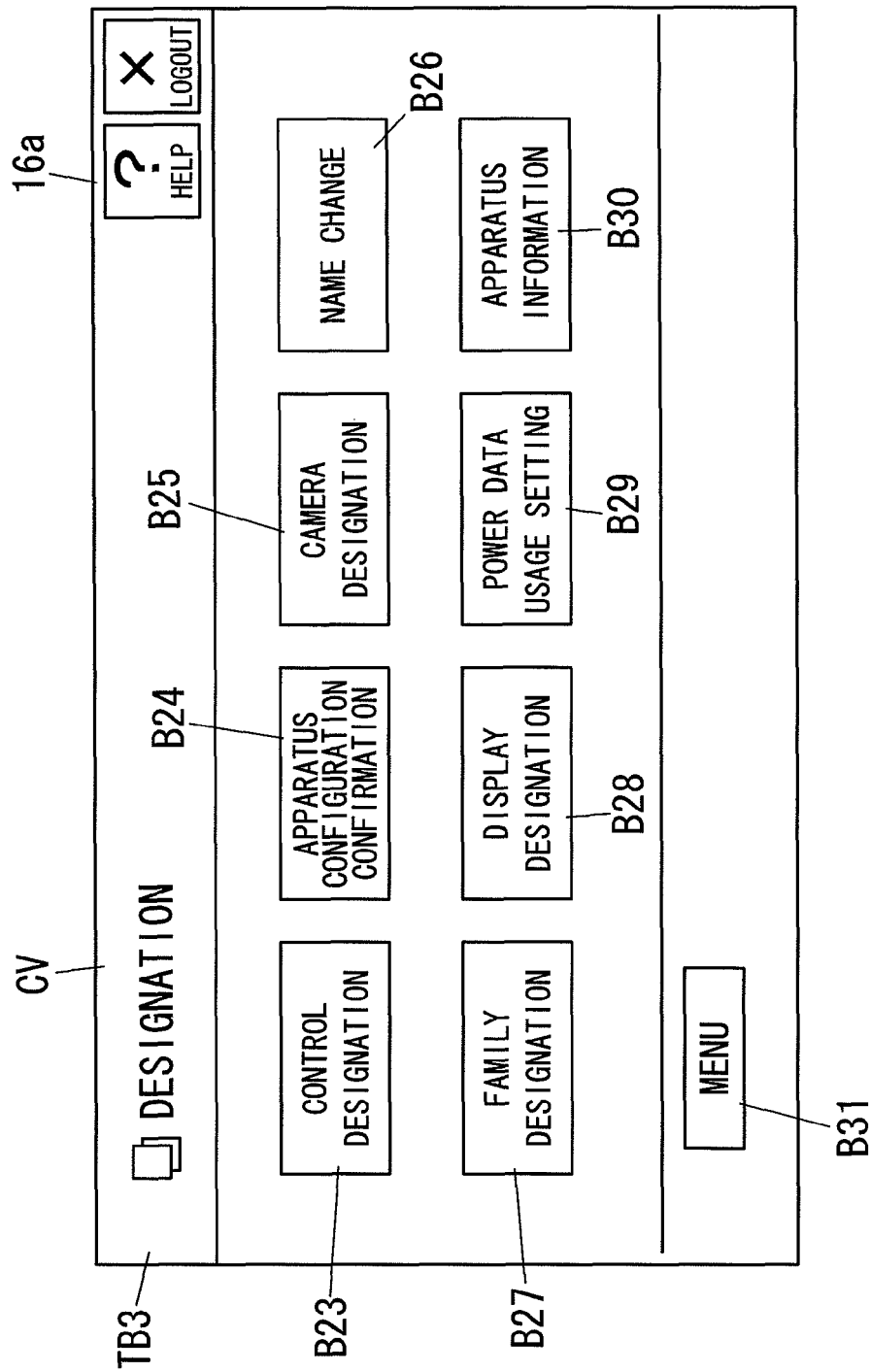
FIG. 9 shows an example of a display screen of the terminal device of the aforementioned energy management system.
Figure 10:
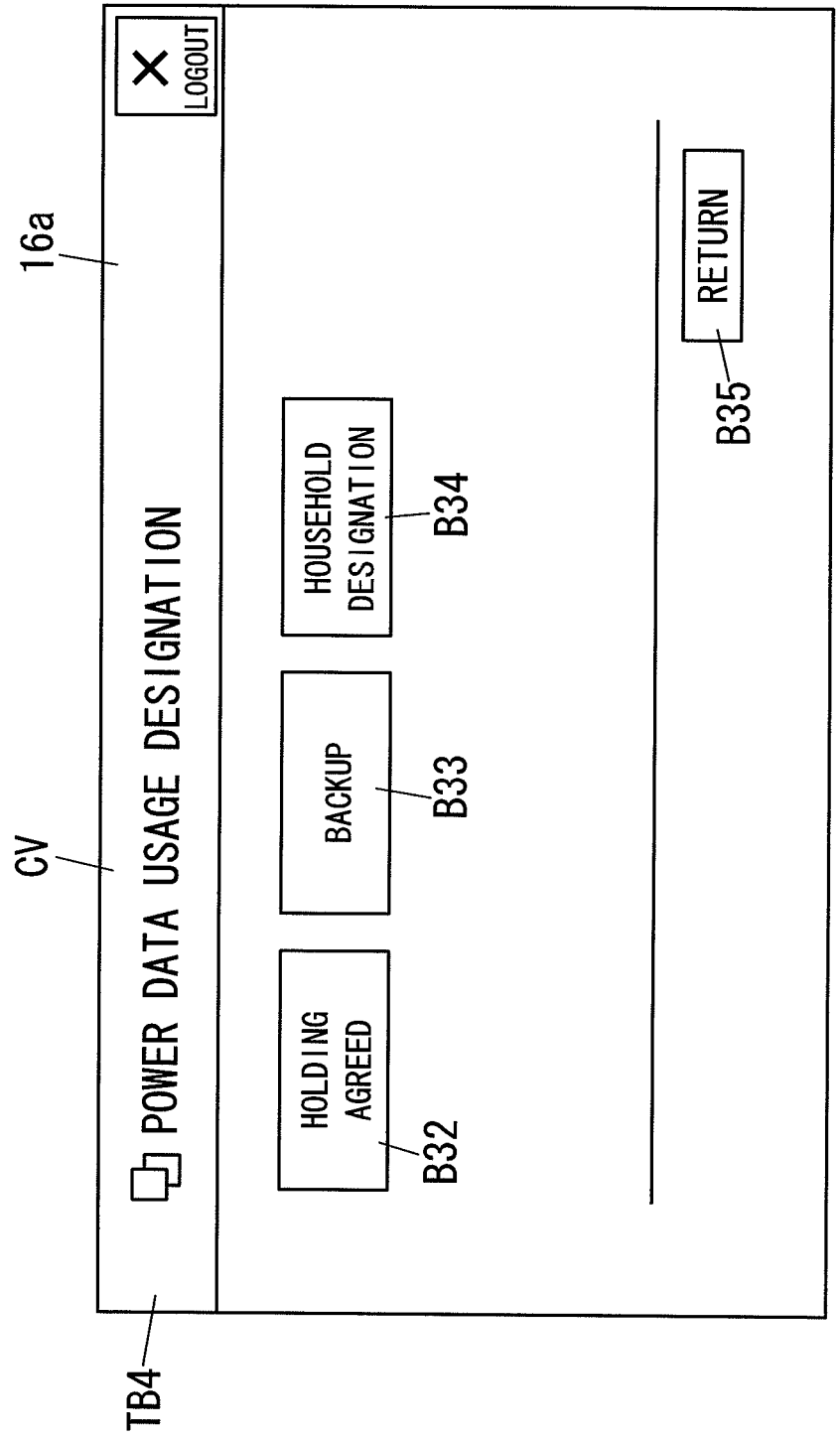
FIG. 10 shows an example of a display screen of the terminal device of the aforementioned energy management system.

FIG. 6 shows an example of a screen (referred to hereinbelow as "initial screen") that is displayed on a display screen 16a of the image display unit 16 when the display control device CV is activated or when the display control device CV is switched from an intermediate screen to a top screen. A title bar TB indicating the screen name (in the present embodiment, "Energy Saving Monitor") is displayed in the upper portion of the initial screen. Further, in the initial screen, an electricity consumption display button B1, an electric check button B2, and a comparison result display button B3 are displayed to the right of the title bar TB. The electricity consumption display button B1 serves to switch from the initial screen to a screen displaying electricity consumption. The electric check button B2 serves to switch from the initial screen to a screen displaying a usage state of electric apparatuses. The comparison result display button B3 serves to switch from the initial screen to a screen displaying the comparison results of the electricity usage. A display section W1 that displays the electricity usage in the current day is disposed in the lower section of the initial screen. A next page button B4 for moving to the next page and a menu button B5 for moving to a menu screen (first menu screen) provided by the area management unit 3 are also displayed in the lower portion of the initial screen.

Where the user selects the menu button B5 in the initial screen, the control unit 17 of the display control device CV controls the transmitting-receiving unit 15 so as to transmit a display request to display the first menu screen to the energy management unit 3 via the integrated device TM. Upon receiving the display request, the energy management unit 3 transmits a webpage for displaying the first menu screen to the display control device CV that is a transmission source of the display request. As a result, the webpage received by the transmitting-receiving unit 15 is displayed on the display screen 16a of the display control device CV. FIG. 7 shows an example of the first menu screen. A title bar TB1 indicating the screen name (in the present screen "menu (½)") is displayed in the upper portion of the first menu screen. Menu selection buttons B6 to B9 for selecting a desired menu are displayed in the center of the first menu screen. In particular, the selection button B6 is for switching from the first menu screen to a menu screen (second menu screen) provided by the center device SV. A previous page button B10 and a next page button B11 for moving to the previous page or next page are displayed in the lower portion of the first menu screen. The text ("Center Server", "Energy Saving Monitor", "Remote Control", and "Net State") that indicates the corresponding menu contents is displayed on the respective selection buttons B6 to B9.

Where the selection button B6 is selected on the first menu screen, the control unit 17 of the display control device CV controls the transmitting-receiving unit 15 so that a display request of displaying the second menu screen is transmitted to the center device SV via the internet NT. Upon receiving the display request of displaying the second menu screen, the center device SV transmits a webpage for displaying the second menu screen via the internet NT to the display control device CV that is a transmission source of the display request of displaying the second menu screen. As a result, the webpage received by the transmitting-receiving unit 15 is displayed on the display screen 16a of the display control device CV. FIG. 8 shows an example of the second menu screen. A title bar TB2 indicating the screen name (in the present screen, "Menu") is displayed in the upper portion of the second menu screen. Selection buttons B12 to B20 for selecting the desired menu are displayed in the center of the second menu screen. In particular, the selection button B15 serves to switch from the second menu screen to an eco screen. The selection button B20 serves to switch from the second menu screen to a designation screen. Further, a movement button B21 for moving to the top page of the registration site and a movement button B22 for moving to the home portal are displayed in the lower portion of the second menu screen. The text ("Camera", "Apparatus Control", "Eco", and "Designation") that indicates the corresponding menu contents is displayed on the respective selection buttons B12 to B20.

Where the selection button B20 is selected on the second menu screen, the designation screen is displayed on the display screen 16a by means of processing similar to that described above (see FIG. 9). A title bar TB3 indicating the screen name (in the present screen, "Designation") is displayed in the upper portion of the designation screen. Selection buttons B23 to B30 for selecting the desired menu are displayed in the center of the designation screen. In particular, the selection button B23 serves to switch from the designation screen to a control designation screen. The selection button B29 serves to switch from the designation screen to a power data usage designation screen. The menu button B31 for moving to the second menu screen is displayed in the lower portion of the designation screen. The text ("Control Designation", "Name Change", "Household Designation", "Power Data Usage Designation", and the like) indicating the corresponding menu contents is displayed on the respective selection buttons B23 to B30.

Where the selection button B29 is selected in the designation screen, the power data usage designation screen (see FIG. 10) is displayed on the display screen 16a by means of the processing similar to that described above. A title bar TB4 indicating the screen name (in the present screen "Power Data Usage Designation") is displayed in the upper portion of the power data usage designation screen. Further, selection buttons B32 to B34 for selecting the desired menu are displayed in the center of the power data usage designation screen. In particular, the selection button B34 serves to switch from the power data usage designation screen to a household designation screen. Further, a return button B35 for moving to the designation screen that is the previous screen is displayed in the lower portion of the power data usage designation screen. The text ("Agree", "Backup", and "Household Designation") indicating the corresponding menu contents is displayed on the respective selection buttons B23 to B30.

Where the selection button B34 is selected in the power data usage designation screen, the household designation screen (see FIG. 11) is displayed on the display screen 16a by means of the processing similar to that described above. A title bar TB5 indicating the screen name (in this screen, "Household Designation") is displayed in the upper portion of the household designation screen. Selection buttons B36 to B38 are displayed in the center of the household designation screen. Here, the selection button B36 serves to select the number of people in the family. The selection button B37 serves to select the residence region (region where the home is located). The selection button B38 serves to select whether the home is all-electric (the all-electric home). A return button B40 for moving to the power data usage designation screen that is the previous screen is displayed in the lower portion of the household designation screen. In addition a registration button B39 is displayed above the return button B40 in the household designation screen. The registration button B39 serves to transmit the contents selected by the selection button B36 to B38 to the center device SV for registration.

The number of people in the household, the residence region, and whether the home is the all-electric home can be inputted in the household designation screen. For example, when the number of people in the household is five, the residence region is Osaka prefecture, and the home is the all-electric home, "5 people" may be selected with the selection button B36, "Osaka prefecture" may be selected with the selection button 37, and "Yes" indicating the all-electric home may be selected with the selection button B38. Where the registration button B39 is pushed after the aforementioned contents (designation contents) have been selected by the selection buttons B36 to B38, a confirmation screen (not shown in the figure) is displayed on the display screen 16a. The designation contents selected by the selection buttons B36 to B38 and a message confirming whether the designation contents are to be registered are displayed on the confirmation screen. Where a "Yes" button indicating the registration of the designation contents is selected in the confirmation screen, the designation contents are transmitted to the center device SV and registered.

Where the designation contents is registered in the center device SV, the own household is verified as a household in the center device SV. As a result, the ranking of the electricity usage or the decrease ratio of the electricity usage can be made among this household and all other households registered in the center device SV. The aforementioned ranking of the electricity usage is made, for example, by comparing the electricity usage of the main breakers Bs of various homes that has been accumulated in the information database DB or by comparing the electricity usage of branch breakers Bmn of the homes for each branch breaker Bmn. Further, the ranking of the decrease ratio of the electricity usage is made, for example, by calculating the degree of the decrease of the electricity usage from the electricity usage in the previous month and the electricity usage in the current month with respect to the main breaker Bs or each branch breaker Bmn and comparing the calculated degree of the decrease among the homes.

A method for displaying the ranking of the electricity usage or the decrease ratio of the electricity usage that has been made by the center device SV on the display screen 16a of the display control device CV is described below.

Where the selection button B15 is selected on the second menu screen, the eco screen (see FIG. 12) is displayed on the display screen 16a by means of the processing similar to the above-described processing. A title bar TB6 indicating the screen name (in the present screen, "Eco") is displayed in the upper portion of the eco screen. Selection buttons B41 to B43 for selecting the desired menu are displayed in the center of the eco screen. Further, a menu button B44 for moving to the second menu screen is displayed in the lower portion of the eco screen. In addition, a display portion W2 displaying the comparison results of the own household with other household under almost identical conditions is arranged to the right of the selection buttons B41 to B43 in the eco screen. The text ("Electric Check", "Electricity Usage Confirmation", and "Data Download") indicating the corresponding menu contents is displayed on the respective selection buttons B41 to B43.

The comparison results displayed on the display portion W2 include, for example, the electricity usage of the own household per one month, the average value of the electricity usage per one month in the entire country, and ranking of the own household in the entire country. In the all-country ranking, the homes with a smaller electricity usage are ranked higher.

Figure 12:
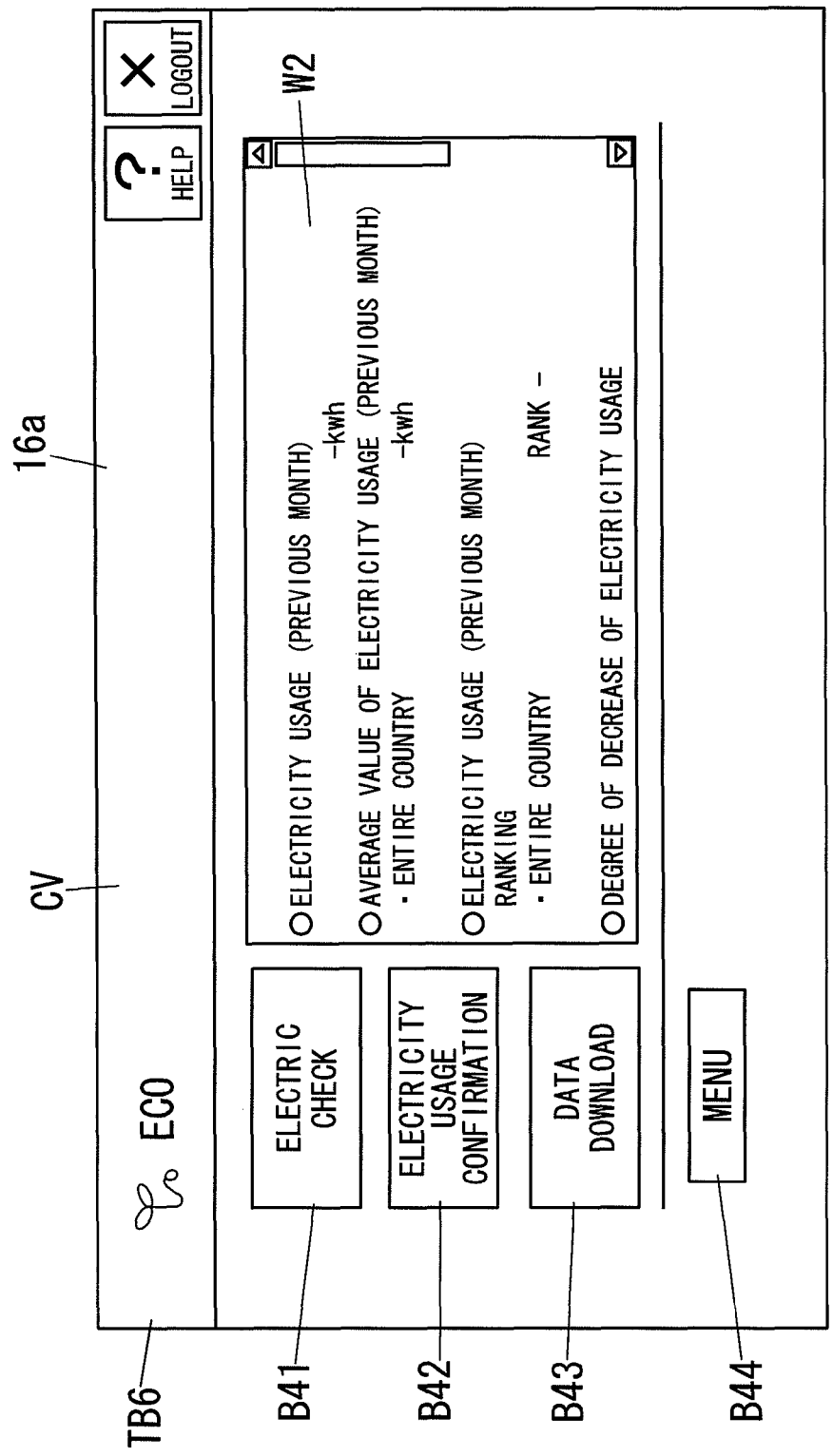
FIG. 12 shows an example of a display screen of the terminal device of the aforementioned energy management system.
Figure 13:
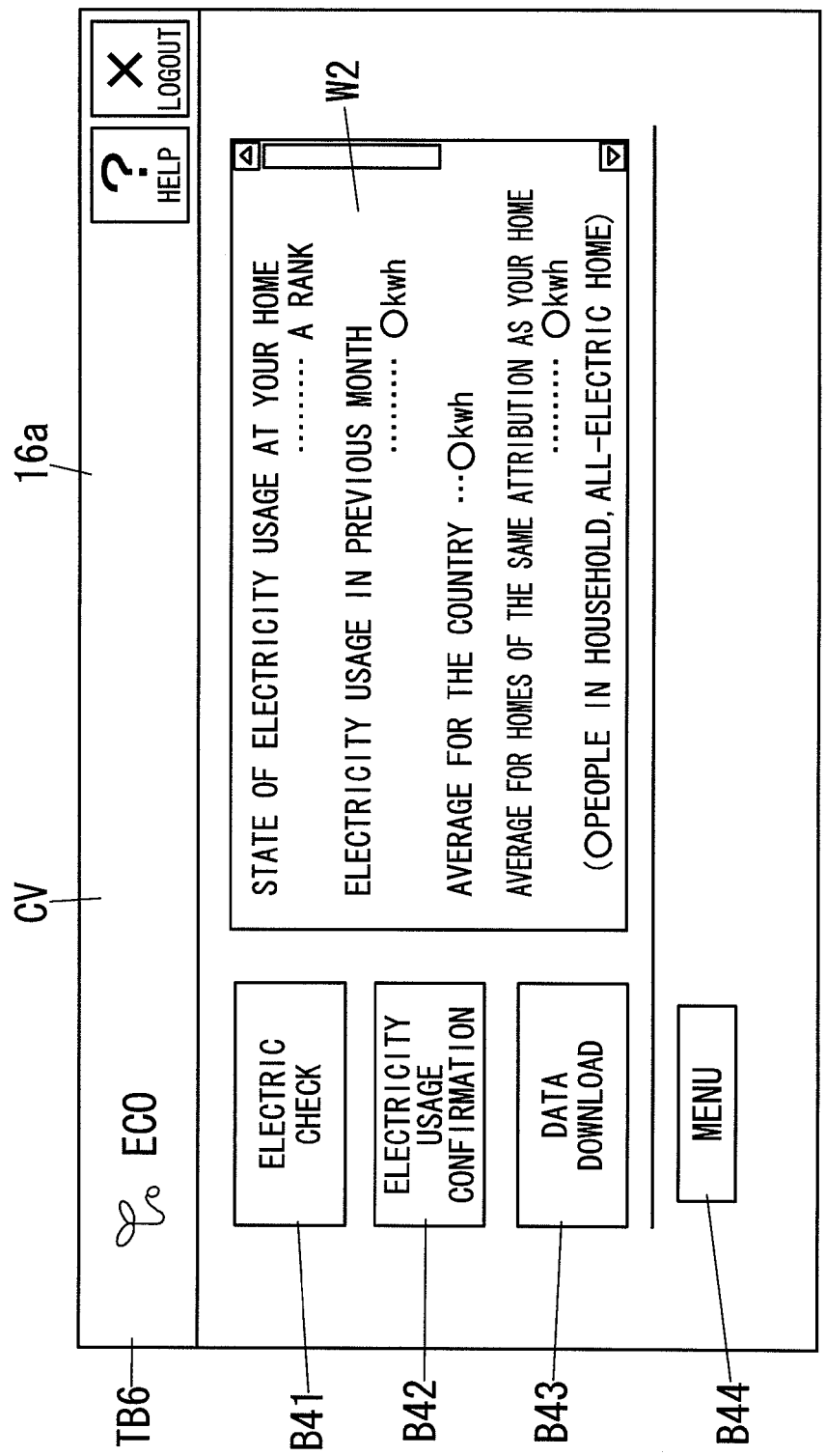
FIG. 13 shows an example of a display screen of the terminal device of the aforementioned energy management system.
Figure 14:
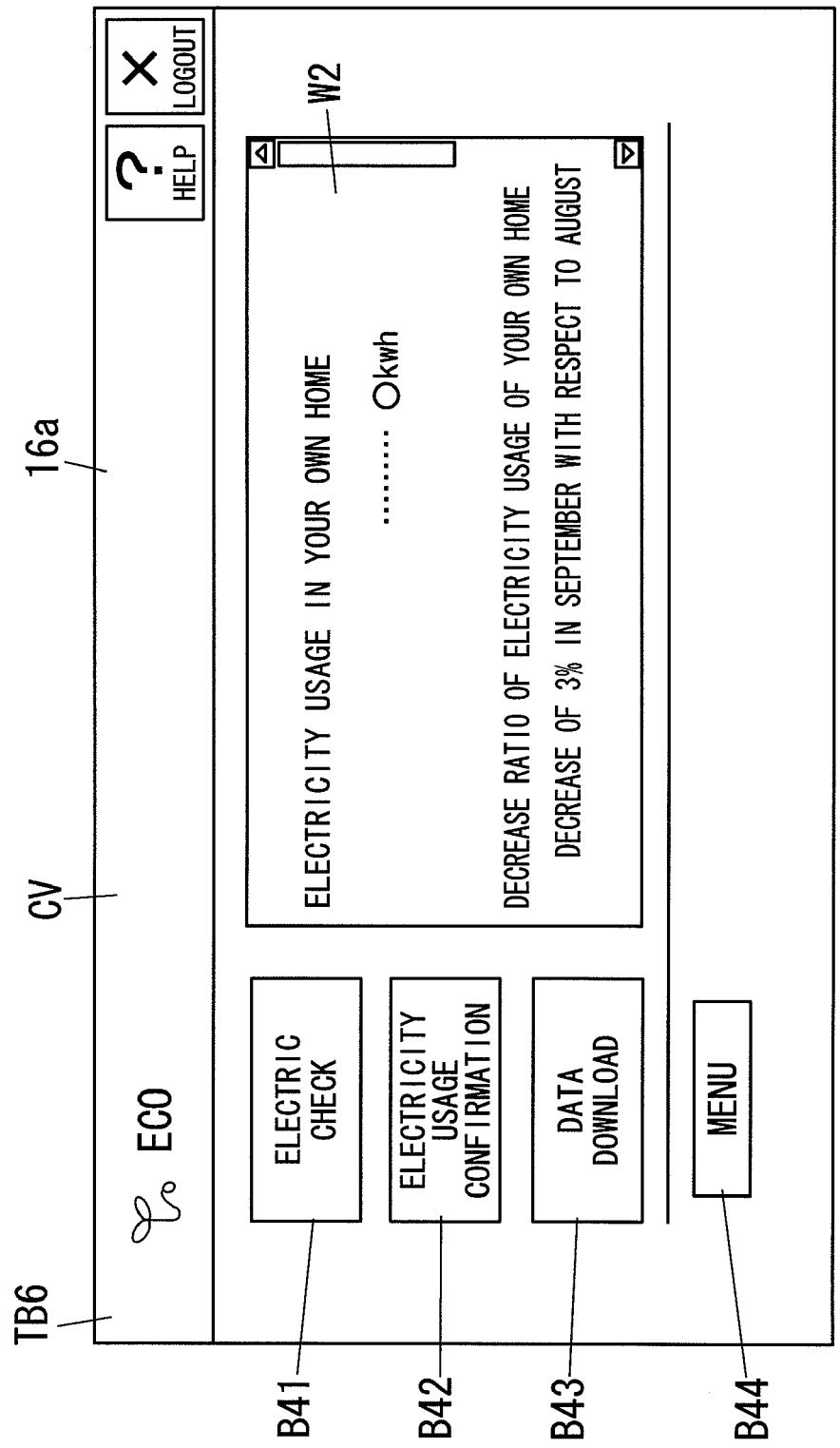
FIG. 14 shows an example of a display screen of the terminal device of the aforementioned energy management system.

Thus, the electricity usage state in each household (for example, the electricity usage is higher than in other households or the energy saving has been achieved) can be recognized by comparing the electricity usage of each household with the electricity usage of other households. By making the ranking, the members of the household can become mindful of energy saving and will try to improve the ranking. As a result, further energy saving can be attained. FIG. 12 shows a specific example of the ranking result, but as shown in FIG. 13, the ranking may be displayed in a rank format, such that the group with a higher ranking is assigned with an A rank and the group with a lower ranking is assigned with a B rank. Further, as shown in FIG. 14, the decrease ratio (the degree of the decrease) of the electricity usage in relation to the previous month may be displayed in addition to the electricity usage. The ranking may be also made by comparing the decrease ratio of the own household with that of other households. In this case, the degree of energy saving in each household can be recognized by comparing the decrease ratio of the electricity usage in each household with the decrease ratio of the electricity usage in other households. By making the ranking, the members of the household can become mindful of energy saving and will try to improve the ranking. As a result, further energy saving can be attained.

In the present embodiment, where the display control device CV transmits to the center device SV a display request to display a screen displaying the ranking, the center device SV transmits a webpage for displaying the ranking to the display control device CV that has transmitted the display request. Therefore, the user can obtain the ranking results when desired. The center device SV can also automatically transmit the webpage for displaying the ranking results to the display control device CV. For example, the center device SV may be configured to display the comparison results periodically (for example, once a month) on the display control device CV that has been registered in advance. In this case, the user can obtain the comparison results, without accessing the center device SV.

Further, in the energy management system of the present embodiment, the designation of the location region (residence range) of the home that is the candidate for ranking, the designation of the home class, and the designation of the predetermined time period can be changed by the above-described webpages (the first and second region designation webpages, the first and second time period designation webpages, and the first and second class designation webpages) provided by the center device SV. The procedure therefor is explained below.

Where the selection button B20 is selected on the second menu screen, the designation screen is displayed on the display screen 16a by means of a procedure that is similar to the above-described procedure. Where the selection button B23 is selected in the designation screen, the control designation screen (not shown in the figure) is displayed on the display screen 16a by means of a procedure that is similar to the above-described procedure. Further, where the screen is moved a plurality of times from the control designation screen by means of a procedure that is similar to the above-described procedure, a selection screen (not shown in the figure) displaying a range selection button for designating the residence range, a time period selection button for designating the time period, and a home selection button for selecting whether the home is the all-electric home is displayed on the display screen 16a. The range selection button enables the selection of the entire country, a prefecture, a city, a district, or lots for sale. The time period selection button enables the selection of a comparison time period, for example, from a week, a month, half a year, or a year. The home selection button makes it possible to select whether the home is the all-electric home or the electric-gas home.

In the explanation above, the predetermined information is inputted using the display control device CV. However, the personal computer PC, the net television TV, the portable terminal PT may be used in addition to the display control device CV for inputting the predetermined information.

In the present embodiment an example is shown in which the energy management unit 3 or integrated device TM is arranged together with the current measurement unit 2 in one integrated control panel 1. However, the energy management unit 3 and integrated device TM may be provided as a control panel separate from the current measurement unit 2. In this case, the current measurement unit 2 and the energy management unit 3 may be connected by a communication cable.

The invention claimed is:
1. An energy management system comprising:
a home appliance located in a home; and
a terminal device connected to said home appliance,
wherein said home appliance comprises a main current measurement unit, a main electrical energy calculation unit, a branch current measurement unit, a branch electrical energy calculation unit, and a processing unit,
said main current measurement unit being configured to measure a current flowing through a main breaker,
said main electrical energy calculation unit being configured to calculate electricity usage at said main breaker on the basis of a measurement of said main current measurement unit,
said branch current measurement unit being configured to measure a current flowing through each branch breaker connected to an output terminal of said main breaker,
said branch electrical energy calculation unit being configured to calculate electricity usage at each of said branch breakers on the basis of a measurement of said branch current measurement unit, and
said processing unit being configured to generate information of electricity usage at the home on the basis of the electricity usage calculated by said main electrical energy calculation unit together with the electricity usage calculated by said branch electrical energy calculation unit, wherein said terminal device comprises a display unit configured to display the information of the electricity usage generated by said processing unit, wherein said energy management system comprises a server connected to said home appliance via an outside network, and wherein said server comprises a history registration unit, an analysis unit, and an result transmission unit, said history registration unit being configured to store history information of the electricity usage at said main breaker and the electricity usage at said branch breaker of each of the homes, said analysis unit being configured to make a ranking of the homes in terms of the electricity usage according to the history information of each of the homes stored in said history registration unit, and said result transmission unit being configured to transmit the ranking made by said analysis unit to said terminal device of each of the homes.

2. An energy management system as set forth in claim 1, wherein said server comprises a storage unit configured to store a data of a region designation webpage prepared to designate a region where a candidate of the home being ranked is located, wherein said terminal device comprises a browser unit and a designation unit, said browser unit being configured to obtain the data of the region designation webpage from said storage unit and control said display unit to display the same, and said designation unit being configured to designate the region within the region designation webpage displayed on said display unit, and wherein said analysis unit is configured to select the home located in the region designated by said designation unit as the candidate for the ranking.

3. An energy management system as set forth in claim 1, wherein said server comprises a storage unit configured to store a data of a time period designation webpage prepared to designate a time period of the history information used for the ranking, wherein said terminal device comprises a browser unit and a designation unit, said browser unit being configured to obtain the data of the time period designation webpage from said storage unit and control said display unit to display the same, and said designation unit being configured to designate the time period in accordance with the time period designation webpage displayed on said display unit, and wherein said analysis unit is configured to make the ranking according to the history information included in the time period designated by said designation unit.

4. An energy management system as set forth in claim 1, wherein said result transmission unit is configured to transmit the ranking to said terminal device at a prescribed timing.

5. An energy management system as set forth in claim 1, wherein said result transmission unit is configured to transmit the ranking to said terminal device in response to a request from said terminal device.

6. An energy management system comprising:

a home appliance located in a home; and a terminal device connected to said home appliance, wherein said home appliance comprises a main current measurement unit, a main electrical energy calculation unit, a branch current measurement unit, a branch electrical energy calculation unit, and a processing unit, said main current measurement unit being configured to measure a current flowing through a main breaker, said main electrical energy calculation unit being configured to calculate electricity usage at said main breaker on the basis of a measurement of said main current measurement unit, said branch current measurement unit being configured to measure a current flowing through each branch breaker connected to an output terminal of said main breaker, said branch electrical energy calculation unit being configured to calculate electricity usage at each of said branch breakers on the basis of a measurement of said branch current measurement unit, and said processing unit being configured to generate information of electricity usage at the home on the basis of the electricity usage calculated by said main electrical energy calculation unit together with the electricity usage calculated by said branch electrical energy calculation unit, wherein said terminal device comprises a display unit configured to display the information of the electricity usage generated by said processing unit, wherein said energy management system comprises a server connected to said home appliance via an outside network, and wherein said server comprises a history registration unit, an analysis unit, and an result transmission unit, said history registration unit being configured to store history information of the electricity usage at said main breaker and the electricity usage at said branch breaker of each of the homes, said analysis unit being configured to make a ranking of the homes in terms of a degree of a decrease of the electricity usage in a predetermined time period according to the history information of each of the homes stored in said history registration unit, and said result transmission unit being configured to transmit the ranking made by said analysis unit to said terminal device of each of the homes.

7. An energy management system as set forth in claim 6, wherein said server comprises a storage unit configured to store a data of a region designation webpage prepared to designate a region where a candidate of the home being ranked is placed, wherein said terminal device comprises a browser unit and a designation unit, said browser unit being configured to obtain the data of the region designation webpage from said storage unit and control said display unit to display the same, and said designation unit being configured to designate the region in accordance with the region designation webpage displayed on said display unit, and wherein said analysis unit is configured to select the home placed in the region designated by said designation unit as the candidate for the ranking.

8. An energy management system as set forth in claim 6, wherein said server comprises a storage unit configured to store a data of a time period designation webpage prepared to designate the predetermined time period, wherein said terminal device comprises a browser unit and a designation unit, said browser unit being configured to obtain the data of the time period designation webpage from said storage unit and control said display unit to display the same, and said designation unit being configured to designate the predetermined time period in accordance with the time period designation webpage displayed on said display unit, and wherein said analysis unit is configured to make the ranking according to the history information included in the predetermined time period designated by said designation unit.

9. An energy management system as set forth in claim 6, wherein said server comprises a storage unit configured to store a data of a class designation webpage prepared to designate a class indicative of whether or not a candidate of the home being ranked is an electric home, wherein said terminal device comprises a browser unit and a designation unit, said browser unit being configured to obtain the data of the class designation webpage from said storage unit and control said display unit to display the same, and said designation unit being configured to designate the class in accordance with the region designation webpage displayed on said display unit, and wherein said analysis unit is configured to select as the candidate for the ranking the home of the same class designated by the designation unit.

10. An energy management system as set forth in claim 6, wherein said result transmission unit is configured to transmit the ranking to said terminal device at a prescribed timing.

11. An energy management system as set forth in claim 6, wherein said result transmission unit is configured to transmit the ranking to said terminal device in response to a request from said terminal device.

* * * * *